(No Model.) 2 Sheets—Sheet 1.

A. M. CLINE & E. C. ECKER.
CIDER PRESS.

No. 555,429. Patented Feb. 25, 1896.

Witnesses
Inventors
Alonzo M. Cline, and
Enos C. Ecker,
by their Attorney (No Model.) 2 Sheets—Sheet 2.
A. M. CLINE & E. C. ECKER.
CIDER PRESS.
No. 555,429. Patented Feb. 25, 1896.
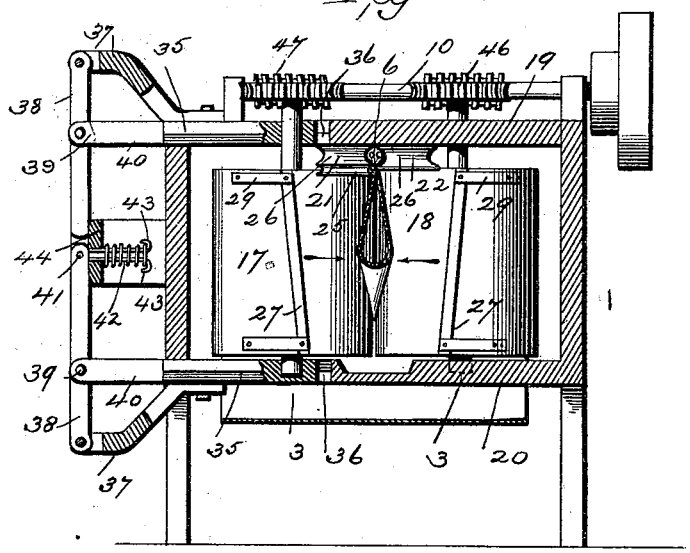
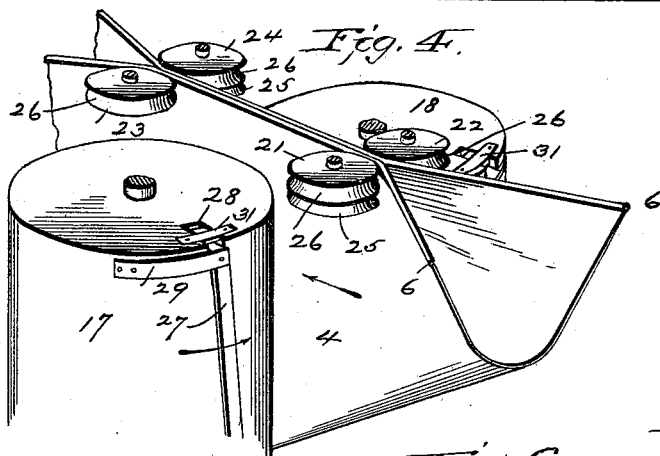
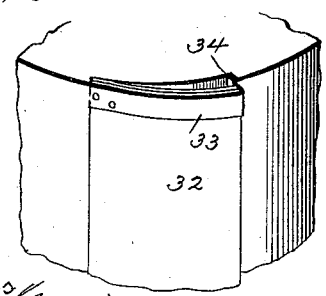
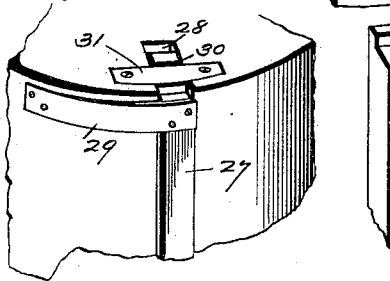

UNITED STATES PATENT OFFICE.

ALONZO M. CLINE AND ENOS C. ECKER, OF STRYKER, OHIO.

CIDER-PRESS.

SPECIFICATION forming part of Letters Patent No. 555,429, dated February 25, 1896.

Application filed May 25, 1895. Serial No. 550,665. (No model.)

*To all whom it may concern:*

Be it known that we, ALONZO M. CLINE and ENOS C. ECKER, citizens of the United States, residing at Stryker, in the county of Williams and State of Ohio, have invented certain new and useful Improvements in Cider-Presses; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in cider-presses; and it has for its object to provide a press of the kind employing an endless apron for receiving the apples and carrying the same between compression-rollers for expressing the juice, wherein the apples will be prevented from being forced from out of the trough formed by the apron until after the juice has been expressed from the apples, the means constituting our invention serving to effect the results sought in a more expeditious and satisfactory manner than heretofore.

It has further for its object to generally improve the construction and arrangement of the several parts entering into the construction of the machine, all as will be hereinafter more particularly described, reference being had to the accompanying drawings, forming a part hereof, and in which—

Figure 1:
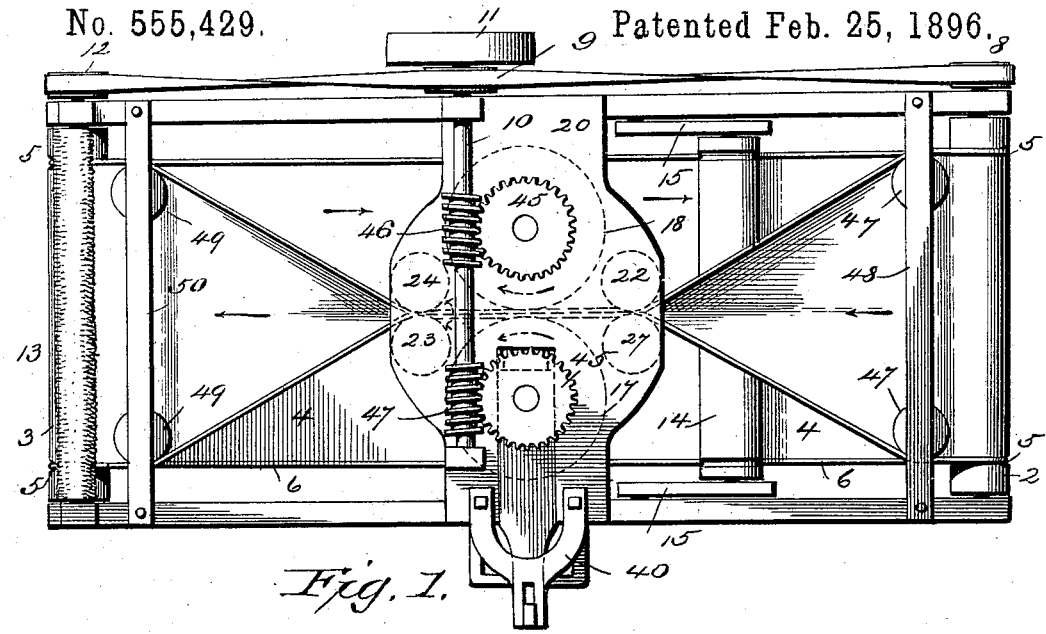
Figure 2:
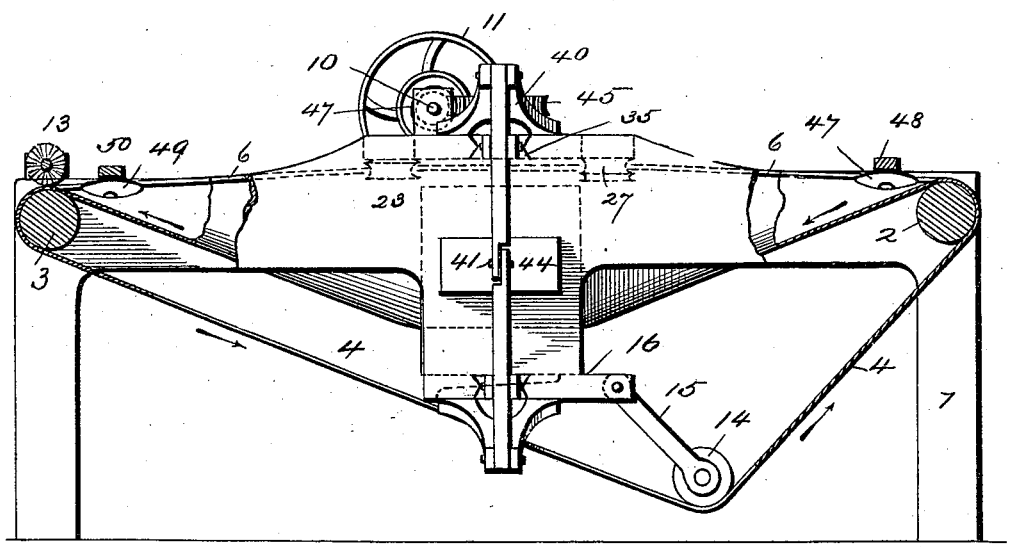

Figure 1 is a top plan view of the machine. Fig. 2 is a side elevation thereof with portions of the apron broken away at both ends; Fig. 3, a vertical transverse section through the machine with the compression-rolls in full lines; Fig. 4, a perspective of a portion of the apron and compression-rolls and guides; Figs. 5 and 6, perspective views of portions of the compression-rolls, showing modified forms of spring-expelled wings or strips, and Fig. 7, detail views of parts of the modified form of spring-expelled wings illustrated in Fig. 6.

In the drawings, the numeral 1 designates the frame of any approved pattern and dimensions. It has journaled in its opposite ends the rollers 2 and 3, around which passes an endless belt or apron 4, the rollers being provided at opposite ends with grooves 5 which are designed to receive the corded edges 6 of the apron, said rollers serving to spread or flatten the apron at the two points where it passes over them, and also to transmit motion to said apron. The rollers are revolved by suitable means—for instance, by a belt or band 7 passing around a pulley 8 secured to the end of the roller 2 and over a pulley 9 attached to the main driving-shaft 10, having the band or driving-pulley 11 secured to its end. The belt or band 7 is extended to the delivery end of the machine, where it passes around a pulley 12 secured on the end of a shaft which carries a brush 13 designed to brush the apple-pomace from the apron after the juice has been expressed from the apples and either before or after the main portion of the pomace has been discharged from the belt, according as said brush may be rotated above or below the roller 3, as may be preferred and as will be obvious to the skilled in the art.

The endless apron 4 is kept taut by means of a tension or take-up roller 14 journaled in hangers 15 which swings from a suitable part of the machine—for instance, from the brackets 16. Between the opposite ends of the machine there are two upright compression rolls or cylinders 17 and 18 formed of any suitable material and suitably journaled—for instance, in cross-bars 19 and 20. These cylinders are designed to compress between them the apples carried by the endless apron 4 as said apron passes between the rolls in a folded condition to form a trough for the apples as they pass between the compression-cylinders.

In order to properly fold the apron to form it into a trough substantially of the shape illustrated in the drawings and to temporarily press or bind together the top edges of the apron as it passes between the cylinders so as to prevent the apples being forced out at the top between the edges of the apron, we employ two sets of grooved sheaves 21, 22, 23, and 24, one sheave of each set of the sheaves—for instance, the sheaves 21 and 24—being formed with an auxiliary groove 25, the main grooves 26 of the several sheaves being designed to receive the corded edges 6 of the endless apron, while the auxiliary grooves to the sheaves 21 and 24 are designed to receive a portion of the apron below the corded edges, as such portion is forced into the auxiliary groove by the opposite companion sheave of each set of sheaves, as illustrated clearly in Fig. 3. By this arrangement of sheaves constructed in this way the opposite edges of the apron are brought and held so close together at the point where the apron passes between the cylinders with the apples that no portion of the apples can be forced out between the edges of the apron, and the entire body of apples in the apron will thus be subjected to compression by the cylinders and all the juice thoroughly expressed or expelled therefrom.

For the purpose of preventing the apples in the trough of the apron between the compression-cylinders from being forced backward from between the cylinders we provide each cylinder at suitable intervals apart with any desired number of spring yielding wings 27 of any suitable form and set into a suitable recess formed in the periphery of the cylinders, said recesses and wings extending lengthwise of the cylinders and the wings being normally projected beyond the surface of the cylinders by the springs. These wings will be arranged in such relation to each other that as the cylinders revolve the wings in the opposite cylinders will be brought face to face with the apron between, so that said wings will compress the apron transversely in a vertical direction at the meeting points of the wings and thus grip the apron and the apples between, so as to feed forward the apples between the cylinders and prevent them from being forced backward by the compression exerted by the cylinders. The preferred form of these wings is that illustrated in Figs. 3, 4, and 6, and in detail in Fig. 7, and consists of the strip or wing 27 set into the groove 28 formed in each cylinder and supported therein by the strap-springs 29 secured to the face of the cylinder and also to the wing or strip, the wing or strip being provided preferably with a shoulder 30 at each end adapted to bear against a block 31 laid across the end of the groove 28, as illustrated in Figs. 4 and 6, so as to prevent the strip or wing from being drawn outward too far by the spring which sustains it within the groove. We prefer to set these wings obliquely across the surface of the cylinder, as illustrated clearly in Figs. 3 and 4 of the drawings.

A modified form of wing is illustrated in Fig. 5, which may consist of a curved metal segment 32 sustained normally beyond the surface of the cylinder by a spring 33, and adapted to be forced temporarily into a recess 34 of the cylinder. The operation of this form of wing will be substantially the same as that first described.

In order to provide for at least one of the cylinders yielding in the event of some hard substance incapable of being crushed passing between the two cylinders, we journal one of the cylinders—for instance, the cylinder 17—in movable spring-actuated bearings, so that after yielding to the hard substance and thus permitting it to pass between the cylinders without doing damage to any part of the machine the spring will throw the cylinder back into its normal position. As a suitable construction for this purpose we have illustrated the two ends of the shaft or journals of the cylinder 17 as journaled in the top and bottom blocks or bearings 35, adapted to slide in ways 36 formed in the upper and lower cross-bars 19 and 20. To an extension or arm 40 from each of these bearings 35 is fulcrumed at the point 39 a lever 38, which at one end is pivoted to a bracket 37, the adjacent ends of the two levers 38 being connected together, for instance, by a pivot-bolt 41. These two levers at their inner pivoted ends are connected to a spring 42 by means of hooks 43, one end of the spring bearing against the inner ends of said hooks and the other end against the bracket 44 projecting from the side of the machine. By this construction and arrangement when the sliding bearings 35 are forced outward the two levers 38 at their inner pivoted ends are thrown outward against the tension of the spring 42, and when the hard substance has passed from between the two cylinders the reaction of the spring 42 draws inwardly the two levers 38 and thus slides the bearings 35 so that the cylinder 17 is brought to its normal position. The system of levers just described we have found to afford a good leverage and efficient means for actuating the cylinder 17; but we wish it understood that changes can be made in the details and such changes still be embraced within the scope of this feature of our invention.

For the purpose of driving the compression-cylinders 17 and 18 we attach to the shaft of each cylinder a cog-wheel 45 and secure to the main drive-shaft 10 right and left hand screws 46 and 47, which will mesh with the cog-wheels 45 and thus cause the screw-cylinders 17 and 18 to revolve in the direction of the arrows shown in Fig. 1 of the drawings, one of the screws being feathered to its shaft, as shown.

For the purpose of keeping the opposite edges of the endless apron 4 spread at the receiving end of the machine we attach two guide disks or plates 47 to a cross-support 48, and inasmuch as these guide-disks will bear against the opposite corded edges of the apron the apron will be kept flat or opened out at the point where it passes over the roller 2 and will gradually converge from that point until it reaches approximately the grooved sheaves 21 and 22, and for the purpose of spreading apart the corded edges of the apron at the delivery end of the machine we place at that end two guide disks or plates 49, attached to a cross-bar 50, which guide-disks will cause the opposite edges of the apron to diverge from approximately the point where they leave the sheaves 33 and 34 until they reach said guide-disk, and from that point around the roller 3 and back to the roller 2 the apron will be maintained in a flattened or opened-out condition. The arrows in Fig. 1 indicate the direction of travel of the endless apron.

The operation of the machine will be apparent to the skilled in the art from the foregoing description and therefore need not be further amplified.

We have illustrated and described what we consider to be the best construction and arrangement of the several parts, but it is obvious that changes can be made therein without departing from the essential features of our invention.

Having described our invention and set forth its merits, what we claim is—

1. In a cider-press, the combination with the endless traveling apron, of the vertically-arranged rotatable compression-cylinders, and spring-actuated wings secured to each cylinder so as to project beyond the face thereof, the wings of one cylinder being so arranged in relation to the wings of the other cylinder that the wings of the two cylinders will be brought opposite to each other so as to compress the apron between the wings of the two cylinders, substantially as and for the purposes described.

2. In a cider-press, the combination of the endless traveling apron, the vertically-arranged rotatable compression-cylinders between which the apron will be passed in a folded condition, and the grooved sheaves arranged at the upper ends of the compression-cylinders to receive the edges of the folded portion of the apron, substantially as and for the purposes described.

3. In a cider-press, the combination with an endless traveling apron, and vertically-arranged rotatable compression-cylinders, of the grooved sheaves at the upper ends of the compression-cylinders adapted to receive the edges of the traveling apron, two of said sheaves having auxiliary grooves to receive a portion of the apron forced therein by the edges of the adjoining sheaves, substantially as and for the purposes described.

4. In a cider-press the combination of the endless traveling apron, the vertically-arranged compression-cylinders one of said cylinders being spring-actuated to enable it to recede from the other cylinder, and grooved sheaves arranged at the upper ends of the cylinders to bind together the opposite edges of the endless apron as it passes between the cylinders in a folded condition, substantially as and for the purposes described.

5. In a cider-press, the combination of the endless traveling apron, the vertically-arranged compression-cylinders, one of said cylinders being journaled in sliding boxes or bearings, pivoted levers connected to said sliding bearings or boxes, and a spring connected with the inner ends of said levers, for permitting said movable cylinder to recede from the other cylinder and then to be restored to its normal position, substantially as and for the purposes described.

6. In a cider-press, the combination of the endless traveling apron, the vertically-arranged rotatable compression-cylinders between which the apron passes in a folded condition, and the spring-actuated wings secured to the two cylinders, said wings being formed with shoulders at their ends, and blocks or stops for said shoulders to bear against to prevent withdrawal of the wings from grooves in the cylinders and in which the wings have play, substantially as and for the purposes described.

In testimony whereof we affix our signatures in presence of two witnesses.

ALONZO M. CLINE.
ENOS C. ECKER.

Witnesses:
R. L. STARR,
HELENE G. WHITLOCK.